United States Patent [19]

Kahn

[11] Patent Number: 5,193,929
[45] Date of Patent: Mar. 16, 1993

[54] METHOD AND APPARATUS FOR PRELOADING A JOINT BY REMOTELY OPERABLE MEANS

[75] Inventor: Jon B. Kahn, League City, Tex.

[73] Assignee: The United States of America as represented by the Administrator of the National Aeronautics and Space Administration, Washington, D.C.

[21] Appl. No.: 892,072

[22] Filed: Jun. 1, 1992

[51] Int. Cl.$^5$ ............................................. B25G 3/00
[52] U.S. Cl. ...................................... 403/14; 403/404; 403/273; 403/321
[58] Field of Search .................. 403/404, 273, 321, 14; 285/381, 422

[56] References Cited

U.S. PATENT DOCUMENTS

| | | | |
|---|---|---|---|
| 3,024,052 | 3/1962 | Oliveau | 403/321 |
| 4,297,779 | 11/1981 | Melton et al. | 29/446 |
| 4,489,964 | 12/1984 | Kipp et al. | 285/422 |
| 4,501,058 | 2/1985 | Schutzler | 285/381 X |
| 4,753,465 | 6/1988 | Dalby | 292/32 |
| 5,024,549 | 6/1991 | Dalby | 403/404 |

Primary Examiner—Andrew V. Kundrat
Attorney, Agent, or Firm—Russell E. Schlorff; Guy M. Miller; Edward K. Fein

[57] ABSTRACT

Method and apparatus for joining structures, an active structure (10) and a passive structure (12), and imposing a tensile pre-load on the joint by a remotely operable mechanism comprising a heat contractible joining element (15). The method and apparatus include mounting on the structure (10) a probe shaft (15) of material which is transformable from an expanded length to a contracted length when heated to a specific temperature range. The shaft (15) is provided with a probe head (21) which is receivable in a receptacle opening (41) formed in the passive structure (12) when the active structure (10) is moved into engagement therewith by an appropriate manipulator mechanism. A latching system (45) mounted on the structure (12) adjacent to the receptacle opening (41) captures the probe head (21) when the probe head (21) is inserted a predetermined amount. A heating coil (26) on the shaft (15) is energizable by remote control for heating the shaft (15) to a temperature range which transforms the shaft (15) to its contracted length whereby a latching shoulder (24) thereof engages latching elements (47) of the latching system (45) and imposes a tensile preload on the structural joint. Provision is also made for manually adjusting the probe head (21) on the shaft (15) to allow for manual detachment of the structures (10,12) or manual preloading of the structural joint.

9 Claims, 3 Drawing Sheets

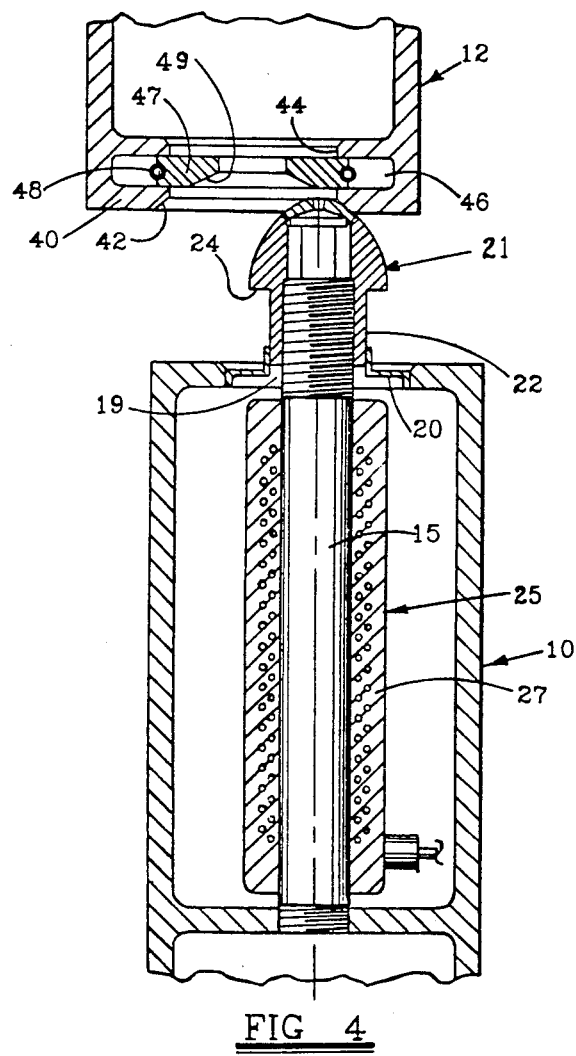
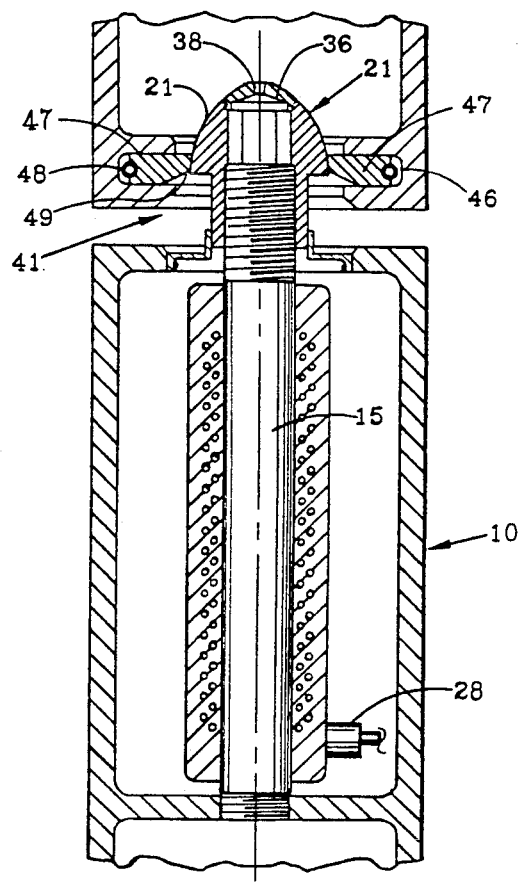
FIG 4
FIG 5

METHOD AND APPARATUS FOR PRELOADING A JOINT BY REMOTELY OPERABLE MEANS

ORIGIN OF THE INVENTION

This invention described herein was made by an employee of the United States of America for governmental purposes without the payment of any royalties thereon or therefor.

FIELD OF THE INVENTION

This invention relates to the joining of structural elements and more particularly to a method and apparatus for joining structural elements and pre-loading the structural joint by a remotely operable mechanism comprising a memory alloy joining element.

BACKGROUND ART

With many architectural construction techniques, the joining of structural elements for various reasons, as where manual access is impossible or undesirable, can be accomplished by a remotely operable mechanism. In some circumstances, it is also a requirement that the structural tie between the joined elements be preloaded to a value exceeding the worst-case loading to which it may be subjected. Such a method for the joining of structural elements and pre-loading the structural joint by a remotely operable mechanism is an anticipated requirement in construction of a space station in the zero gravity environment where it is foreseen that many of the structural segments must be structurally attached to each other after they are brought into close proximity by the manipulation of the arm of a remote manipulator system and an associated capture latch system. A conventional method of making such an attachment is by a motor-driven bolt system which drives a threaded bolt across from the structural element on the active side of the joint into a floating nut on the passive side of the joint. While this technique provides a convenient method for detachment and reattachment of structural elements, the motor and gearbox at each joint can be a heavy weight penalty, particularly for a one-time connection. Memory alloys have been used in structural joints such as shown in U.S. Pat. No. 4,753,465 wherein a locking mechanism comprising a memory alloy connecting element is releasable by remotely operable means which controls the memory alloy element and in U.S. Pat. No. 4,297,779 wherein a memory alloy connecting element is joined in a dovetail receptacle element. However, neither of these patents relates to the joining of structural elements and imposing a predetermined tensile preload across the structural joint by a remotely operable means.

SUMMARY OF THE INVENTION

The invention is a method and apparatus for the joining of structural elements, designated an active structural element and a passive structural element respectively, and preloading the structural joint by a remotely operable mechanism which comprises a memory alloy joining element. The method and apparatus include the mounting on the active structural element of an elongated shaft of heat contractible material which is capable of changing from an expanded length to a smaller contracted length upon application of heat at a transition temperature sufficient to cause transformation of the shaft to its contracted length. The shaft is provided on one end with a probe head having an external latching shoulder. The second structural element, designated the passive structure, is provided with a receptacle member adapted to receive the probe head on the heat contractible shaft when the probe head is placed therein. A spring-loaded latching mechanism mounted in the receptacle member is provided with a plurality of latching elements which are adapted to latchingly engage the latching shoulder on the probe head of the heat contractible shaft when the probe head is inserted therethrough and thereby loosely join the active and passive structural elements in a state of "soft-capture". A controllable heating means is mounted on the heat contractible shaft and is operable by remote control means to heat the shaft to a transformation temperature which causes the shaft to transform from its expanded length to its smaller contracted length and the latching shoulder of the probe head to lockingly engage with load surfaces on the latching elements and thereby impose on the structural joint, a tensile pre-load of predetermined magnitude.

By provision of a removable cap on the probe head and insertion of a tool in the socket uncovered by removing the cap, means are provided for manually detaching the probe head from the shaft to effect release of the joined structures or to manually impose a tensile preload on the structural joint.

BRIEF DESCRIPTION OF THE DRAWINGS

FIG. 4 is a sectional view of the two structural elements as they are first brought together and showing a probe mounted in the active structural element and making initial contact with a conical receptacle surface provided in the passive structural element;

FIG. 5 is a view similar to FIG. 4 but showing the probe positioned deeper into the conical receptacle and engaging and spreading latching ring segments of the spring-loaded latching system;

DETAILED DESCRIPTION OF THE INVENTION

Figures 1, 2, 3:
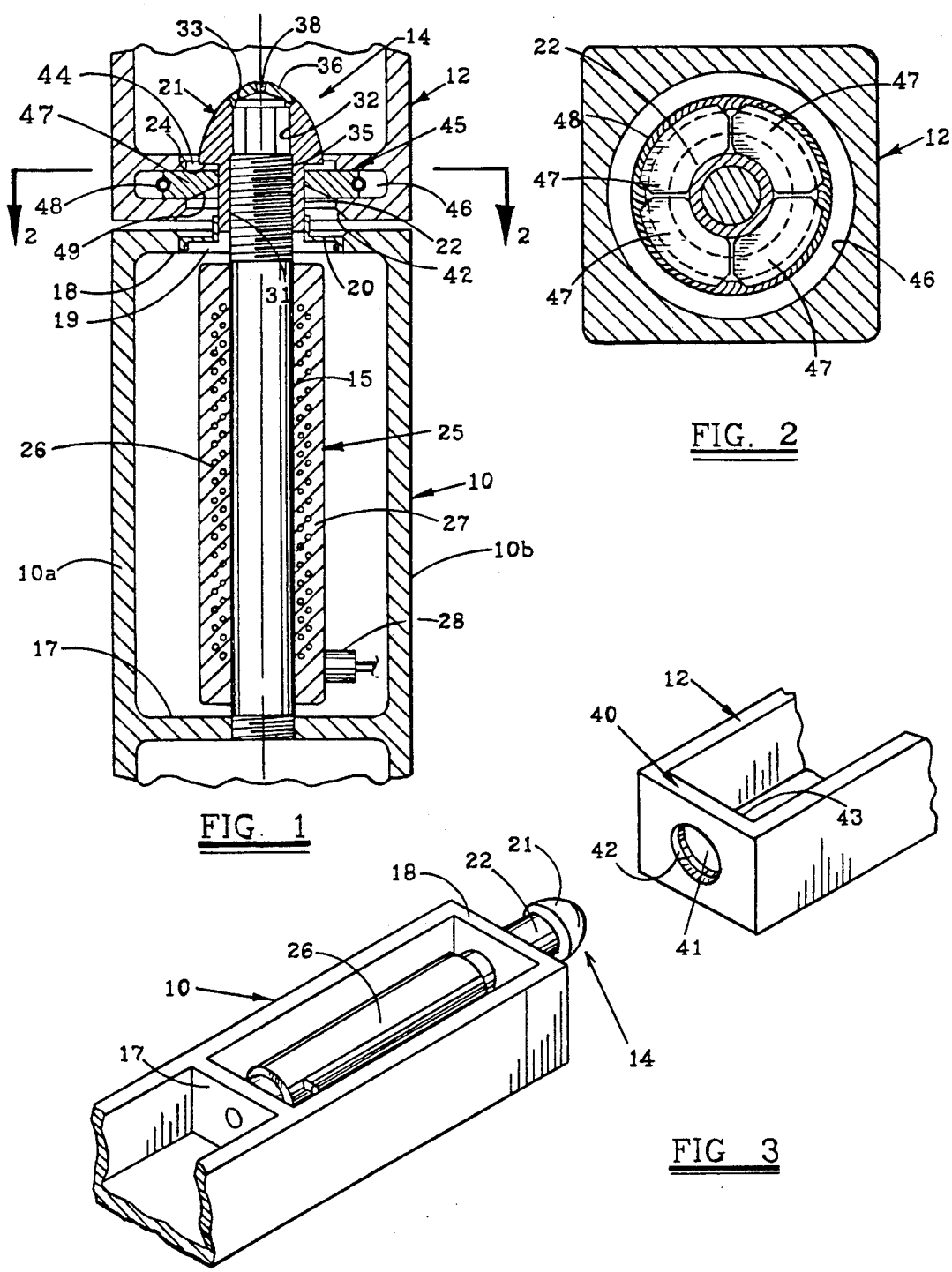
FIG. 1 is a sectional view through a pair of structural elements, representing an active structure and a passive structure, after the pair have been moved together in a loose coupling "soft-capture" relationship.
FIG. 2 is a sectional view as taken along the section line 2—2 of FIG. 1 showing details of the spring-loaded latching system which is mounted in the structural element which represents the passive structure.
FIG. 3 is a view in perspective of the two structural elements to be joined showing the two structures as they are brought into close proximity to one another.

Referring more particularly to the drawings, there is shown in FIG. 1, a structural element 10, which is loosely coupled to a passive structural element 12 after they have been pulled together by an appropriate capture mechanism (not shown). The structural elements 10 and 12 are elongated machined channel shaped beams of a general "U" shaped in cross section and of a material which is suitable for use in building portions of a space station.

The structural element 10, which herein is also referred to as the active structure, is equipped with a probe 14 comprising an elongate shaft 15 which is anchored at one end to a transverse wall 17 which extends between the walls 10a, 10b of the structural element 10 in integral connection therewith. The transverse wall 17 is provided with a centrally located threaded opening which receives a threaded end of the shaft 15 such that the shaft 15 and structural element 10 are in coaxial alignment with respect to their longitudinal axes. The shaft 15 is prevented from further rotation by a suitable fastener, adhesive or by a press-fit pin (not shown).

A second transverse member 18 extends between the walls 10a, 10b at the end of the structural element 10 and is provided with a central opening 19 which is fitted with an annular guide 20 attached about its periphery to the wall of the opening 19 in central axial alignment therewith. The shaft 15 is also threaded and extends through the opening of the annular guide collar 20 and is fitted with a probe head 21.

The probe head 21 is formed with an enlarged contact end portion having a generally, paraboloidal exterior surface and also includes a coaxially aligned cylindrical shaft section or neck 22 which forms an external downwardly facing annular shoulder 24 at its junction with the enlarged contact end portion. The probe head 21 is also formed with an axial opening which extends through its neck section 22 and the contact end of the probe head 21 and includes an internally threaded section 31 in the neck 22 for accommodating its connection with the threaded end of the shaft 15. The cylindrical neck 22 fits snugly within the guide collar 20 but is freely slidable therein. The collar 20 serves to prevent the imposition of bending loads on the memory alloy shaft 15 of the probe during capture.

The axial opening through the probe head 21 also includes an intermediate section or socket 32 of hexagonal cross section and an annular internally threaded upper end section 33 with an internal diameter greater than the largest internal transverse dimension of the hexagonal section 32. An internal downwardly facing annular shoulder 35 is formed at the junction of the hexagonal section 32 with the lower threaded section 31 and engages the end of the shaft 15.

The contact end of probe head 21 at its vertex, is provided with an end cap 36 having an externally threaded cylindrical end portion which is received into an upper threaded end section 33 of the opening through the probe 14. At its tip, the cap 36 is provided with a smaller hex socket 38 for accommodating a tool for rotating the cap 36 to effect its installation or removal from the body of the probe 14. The external surface of the cap 36 joins the external surface of the remainder of the probe head 21 to form therewith a substantially paraboloidal surface.

The probe shaft 15 is fabricated from a heat contractible material, preferably a memory alloy of nickel and titanium. Such a memory alloy has the unique property that below a specific temperature which may be designated a transition or transformation temperature, it may be mechanically deformed from a predetermined given shape to a second shape and returned to the predetermined shape when the temperature is raised to the known transition temperature range. The acquired shape-memory is the result of a change in the crystal structure of the alloy known as a reversible austenite to martensite phase transformation While at a temperature below the transition temperature, shaft 15 is first machined at a length which is shorter than is necessary for making a structural joint between the structures 10 and 12. It is then stretched while still cool and martensite by approximately 8% of its initial length to a second length which is sufficient to extend beyond the spring-loaded latching system and effect a soft-capture as shown in FIG. 1. A strain or deformation of about 8% from its predetermined shape is the maximum that will allow a complete recovery of the shaft from its martensite expanded length to its memory length and austenite phase when heat is applied in a specified temperature range.

The structural element 12, which is also referred to as the passive structure, is provided with a transverse end wall 40 with a central opening 41 defined by a frusto-conical surface 42 of greater diameter than the longest transverse dimension of the probe head 21 (See FIG. 3). A spring-loaded latching system 45 is fitted to the passive structure 12 adjacent the end wall 40 and is received in an annular recess 46 formed in the end wall 40 in coaxial relation to the opening 41 and of greater diameter than the opening 41. The transverse backside 43 of the wall 40 is also provided with a central opening 44 in axial alignment with the opening in the end wall 40 and of a diameter corresponding to the smallest diameter of the frusto-conical surface 42 which defines the opening in the end wall.

The latching system 45 consists of several latching ring segments 47 which are disposed in circular array and biased to an innermost position within the annular recess 46 by a circular tension spring 48 positioned circumferentially about the circular array of ring segments 47 as shown in FIG. 2. Each ring segment 47 is provided with a groove in its outermost arcuate peripheral surface which seats the tension spring 48 therein.

Also, as best seen in FIG. 1, the annular recess 46 in the wall 40 is provided with a radial transverse dimension sufficient to accommodate a radial expansion of the circular array of ring segments 47 which fit snugly within the recess 46 but are each freely slidable in a radial transverse direction of their circular array.

The bottom surface of each ring segment 47 is formed with a downward facing bevelled surface 49 in the form of an arcuate portion of a frusto-conical surface which extends from the planar bottom surface of the ring segment to its inner peripheral surface.

When the active structural element 10 is moved toward the passive structural element 12, as by means of the manipulator arm of a remote manipulator system, it is placed in approximate longitudinal alignment with the element 12 such that the probe head 21 makes initial contact with the frusto-conical surface 42 on the end wall 40, as shown in FIG. 3. As the active structural element 10 is moved further in the longitudinal direction towards the passive structure 12, the probe is guided by the frusto-conical surface 42 into the central opening 41 defined by the surface 42. As the probe is forced further into the hole as shown in FIG. 4, the probe head 21 makes contact with the bevelled surfaces 49 on the latch ring segments 47 and spreads the several ring segments 47 radially outward from their initial circular array position against the biasing action of the tension spring 48. When the annular shoulder 28 of the probe head 21 penetrates past the ring segments 47 as shown in FIG. 1, the ring segments 47 are sprung back inwardly by the spring 48 until they contact the cylindrical neck 22 of the probe head. In this condition, the structural element 10 is loosely coupled to the structural element 12 and is in a state of "soft-capture".

Figure 6:
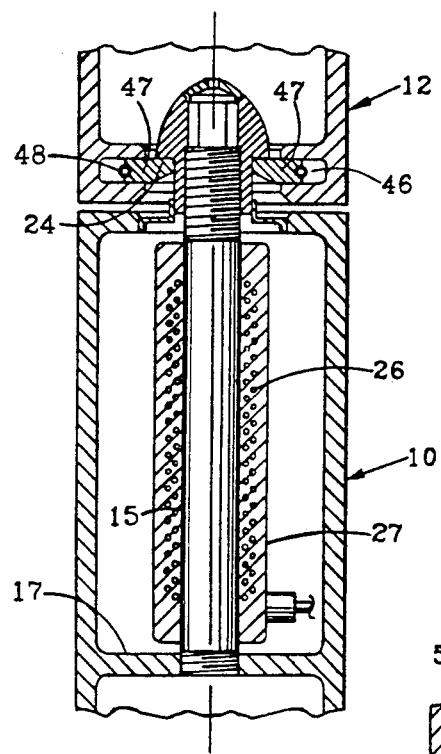
FIG. 6 is a sectional view showing the structural elements of FIG. 1 after having been joined together and a tensile preloading applied to the joint by a remotely operable mechanism of the invention.

However, for connecting the structures 10 and 12 together on a permanent basis and to maintain a maximum stiffness of the structural tie therebetween, the joint must be preloaded to a value which exceeds the anticipated worst-case loading. By an application of heat to the probe shaft 15 which raises its temperature to the known transition temperature range, the shaft 15 is caused to shrink to its predetermined given length and thereby impose a tensile preload on the structural joint by the clamping action of the shoulder 24 of the probe head 21 against the upper surfaces of the latch ring segments 47 as shown in FIG. 6.

For applying heat to the probe shaft 15, it is fitted with a heating collar 25 which consists of a wire coil 26 encapsulated in a ceramic electrically insulating material 27. The heating collar is sleeved tightly about the shaft 15 and extends over the intermediate portion of the shaft 15 between its threaded ends. The heating coil wire is run to an electrical connector 28 which is linked to a switch controlled electrical power source (not shown).

Once the structures are mated and the joint is soft-captured, an electrical current is applied to the heating collar 25, warming the memory alloy shaft 15 and causing it to transform. As the transformation takes place, the shaft exerts a high tensile load as it attempts to shrink back to it's original length. This action will bring the structures into full contact and preload them to an amount related to the shaft's design (see FIG. 6). The diameter of the shaft must be sized to account for the fact that it will later cool, bringing it down to a strength level in the martensite range (typically only 10,000 to 20,000 psi yield). While this is a rather low strength for a structural fastener, the size necessary is nevertheless in a range which makes the design much lighter than a system powered by an electric gear motor.

The length necessary for the shaft's design is a function of the soft-capture gap size and the amount of preload required. Research testing has shown that if the free retraction (soft-capture gap plus "over-shoot" margin) is less than about 6% of the strain, the austenite preload will be greater than the martensite yield strength. For example, if the joint is to have a final preload of 10,000 psi and the martensite yield strength of the alloy is 15,000 psi, the diameter of the shaft required is about 1 inch. If the soft-capture gap and the over-shoot margin are together 0.2 inch, the shaft length necessary for 4% free retraction is 5 inches (between the threaded portions). This means that the shaft would be manufactured with an original length between threads of 4.6 inches, and then stretched to 5 inches (8%) strain). Upon activation, the shaft will shrink until contact is made (4.8 inches shaft length). The remaining tendency of the shaft to shrink further will exert a preload of a relatively high value due to the fact that its austenite strength is several times that of the martensite (cooled) range. After cooling, the shaft will weaken and yield until a stable preload is reached. Depending on the surrounding structure's stiffness and the efficiency of the memory alloy, this preload will be at least that of the martensite yield strength. The preload may be verified through the use of a strain gauge mounted at a strategic location on the structure, such as the web or transverse wall 17 where the shaft is fastened permanently. Any environmental heating of the joint will cause an increase in strength if the transformation temperature is exceeded because the austenite yield strength is much higher than the martensite.

It is to be noted that a precaution remains to be taken after the probe shaft is installed in the structure. It is very important that the memory alloy shaft be kept below its transformation temperature to prevent an accidental activation. Since it is not always practical to keep the shaft refrigerated during transportation, as in the payload bay of the Space Shuttle, the memory alloy should be of such composition that its transformation temperature is above that of all temperatures to be experienced prior to planned activation.

The four latching ring segments 47 are designed to be installed in the structure without the need of a removable flange. Since each segment is small enough to fit through the hole 41, the last segment may be installed by spreading the first three segments apart deeper into the recess 46. A small lateral misalignment between the structures 10 and 12 is permissible since the diameter of the hole 41 and hole 44, which are equal, are larger than the probe head 21, and the latching ring segments 47 are free to shift within the recess 46. This is necessary because thermal conditions or other conditions may have caused the multiple attach points between the two structures to be slightly misaligned.

Figure 7:
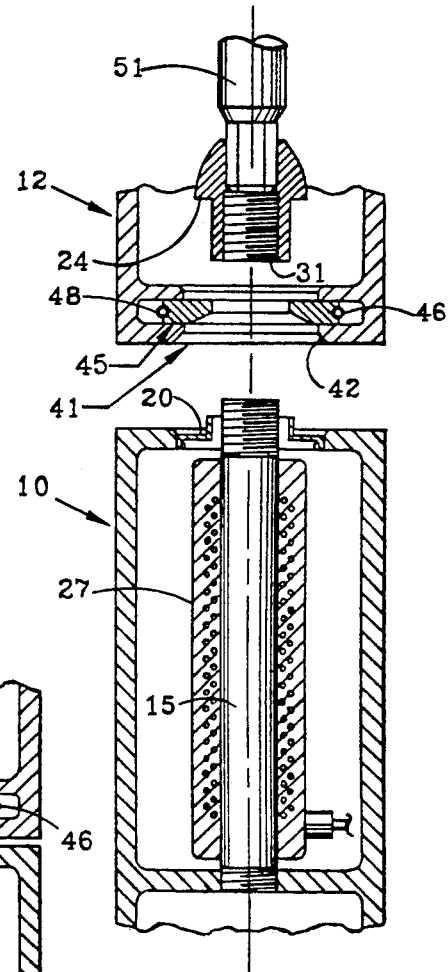
FIG. 7 is a sectional view showing the structural elements in separated condition after having been released from their joined condition by means of a power tool inserted into the probe head.
Figure 8:
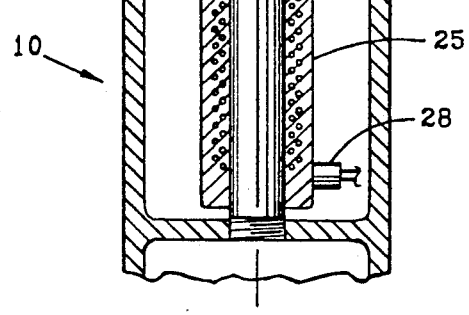
FIG. 8 is a sectional view of the structural elements after having been joined together and a power tool inserted into an opening in the probe and applying a tensile preload to the structural joint.

Although this design may be remotely activated only one time since the memory alloy transformation is not repeatable without stretching, a provision is made to allow manual detachment of the joined structure or for preloading of the joint. The cap 36 may be removed by a small tool placed in the socket 38, thus allowing access to the larger hexagon socket 32 in the probe 21. Using a high-torque power tool, a rotor or an astronaut in extra-vehicular activity inserts the tool 51 into the probe head socket 32, as shown in FIG. 7, and unscrews the head 21 from the memory alloy shaft 15. Once the head 21 is removed, the structures 10 and 12 are free to be separated. However, if manual preloading of the joint is intended rather than separating, the additional empty threads in the probe head 21 allow turning of the probe on the shaft for manual preloading in case of heater or memory alloy failure.

Since the heater has not been activated, the martensite yield strength of the memory alloy has not been affected and the capability of the shaft 15 to perform in applying a tensile preload is not reduced. Further, to prevent vibration or cycling from back driving the threaded connection of the probe head with the shaft 15, the internal threads of the probe head are a self-locking "wedge-lock" design, thereby insuring maintenance of the preload.

It is to be appreciated therefore that the structural fastener of the invention may be used as a structural fastener in architecture or industry wherever two structures must be joined together and it is particularly useful where manual access to make a structural tie is not possible or practical. Other significant advantages of the invention are the greater simplicity and reliability of the apparatus and method for forming the structural joint because of the absence of gears and motors in the required apparatus. The simpler apparatus and method of the invention also provide a significant weight advantage and dramatically lower costs as compared to other systems wherein motor-driven bolts are currently used for forming one-time structural joints.

It is also to be appreciated that the foregoing description of the invention has been presented for purposes of illustration and explanation and is not intended to limit the invention to the precise form disclosed. For example, the memory alloy joint described herein may be used to join structural members where the structural members are not necessarily channelled members so long as there is enough volume or space, primarily as relating to the length dimension, to allow the system to function. Also, if precise alignment between structures is a requirement of the joint, the collar 20 may be designed with a conical shape to mate with the conical entry hole in the passive structure 12. It is to be appreciated therefore, that changes may be made by those skilled in the art without departing from the spirit of the invention.

I claim:

1. Apparatus for joining a pair of structural elements and imposing a tensile preload on the structural joint, said apparatus comprising:

a probe including an elongated shaft of heat contractible material capable of changing from an expanded length to a contracted length upon an application of heat in a specific transition temperature range, said shaft being provided at one end with a probe head having an external latching shoulder formed thereabout;

means for mounting said shaft on a first of said structural elements with the probe head thereof projecting therefrom, the second of said structural elements being provided with a receptacle opening adapted to receive the probe head of said shaft when the first structural element is moved in proximity to the second structural element with said shaft in approximate alignment with the receptacle opening;

a latching system mounted on said second structural element adjacent to the receptacle opening for latchingly engaging said probe head when the probe is inserted a predetermined minimal distance into said receptacle opening and thereby forms a loose soft-capture joint between said first and second structural elements; and means for heating said elongated shaft to said transition temperature range to cause said shaft to transform from said expanded length to said contracted length and said latching shoulder to engage with said latching mechanism and impose a tensile preload across said joint.

2. An apparatus for joining a pair of structural elements as set forth in claim 1, wherein said elongated shaft is a memory alloy of nickel and titanium.

3. An apparatus as set forth in claim 1 wherein said elongated shaft is a memory alloy which in its expanded length is in the martensite phase of crystallization and which recovers to the austenite phase as the shaft transforms to its contracted length upon application of heat in said transition temperature range.

4. An apparatus as set forth in claim 1 wherein said heating means includes an electrical heating element mounted on said elongated shaft and having electrical leads whereby the heating element may be electrically connected to a controlled electrical power source.

5. An apparatus as set forth in claim wherein said latching system comprises:

a plurality of ring segments arranged in a circle array in coaxial relation with said receptacle opening and each of said segments being movable in a radial direction with respect to said circle, and a circular tension spring positioned circumferentially about the circular array of ring segments in engagement with said ring segments and biasing the ring segments to an innermost position in circular array defining an opening adapted to receive the probe head of said shaft whereby said latch ring segments are moveable radially outward by initial penetration of said probe head and are moveable radially inward to said innermost position by said spring upon further penetration of said probe head by said predetermined minimal distance to thereby effect a soft-capture joint between said first and several structural elements.

6. An apparatus as set forth in claim 5 wherein said second structural element is provided with an outwardly diverging frusto-conical surface for defining said receptacle opening and facilitating the entry of the probe shaft therein.

7. A process for joining a pair of structural elements and for imposing a tensile preload on the resulting structural joint, said process comprising:

stretching an elongated shaft of heat contractible metal alloy from a predetermined length to an expanded length, fitting one end of said shaft with a probe head having an external latching shoulder formed thereabout, mounting said shaft on a first of said structural elements with the probe head projecting therefrom, providing the second of said structural elements with a receptacle opening adapted to receive the probe head of said shaft therein and a latching system mounted adjacent to the receptacle opening and comprising a plurality of latching elements with load bearing surfaces extending radially with respect to the axis of said opening, said latching system being adapted to latching engage the probe head of said shaft when said probe head is inserted a predetermined minimal distance into the receptacle opening to thereby form a loose soft-capture joint between said first and second structural element, moving said first structural element to where said probe head engages the second structural elements substantial alignment with said receptacle opening and to where said probe head is inserted said predetermined minimal distance into said receptacle opening, whereby said latching system latchingly engages the probe head to form a loose soft-capture joint between said first and second structural elements, and heating said elongate shaft to a transition temperature range which causes said shaft to contract from tis expanded length to said predetermined length and the latching shoulder of the probe head to engage with said load bearing surfaces of the latching elements and impose a tensile load on said joint.

8. a process as set forth in claim 7 further including maintaining said elongated shaft at a temperature below said transition temperature rang prior to forming the loose soft-capture joint between said first and second structural elements.

9. The process as set forth in claim 7 wherein said elongated shaft is a memory alloy in a martensite phase of crystallization when stretched from its predetermined length to its expanded length.

* * * * *